(12) United States Patent
Schwarz

(10) Patent No.: US 10,060,282 B2
(45) Date of Patent: Aug. 28, 2018

(54) GEARED TURBOFAN WITH INTEGRALLY BLADED ROTOR

(71) Applicant: United Technologies Corporation, Hartford, CT (US)

(72) Inventor: Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 288 days.

(21) Appl. No.: 14/709,573

(22) Filed: May 12, 2015

(65) Prior Publication Data

US 2015/0354399 A1 Dec. 10, 2015

Related U.S. Application Data

(60) Provisional application No. 62/010,046, filed on Jun. 10, 2014.

(51) Int. Cl.
*F02C 3/107* (2006.01)
*F01D 15/12* (2006.01)
(Continued)

(52) U.S. Cl.
CPC .............. *F01D 15/12* (2013.01); *F01D 1/18* (2013.01); *F01D 5/02* (2013.01); *F01D 5/34* (2013.01); *F02C 3/06* (2013.01); *F02C 3/107* (2013.01); *F02K 3/06* (2013.01); *F05D 2220/32* (2013.01); *F05D 2230/53* (2013.01); *F05D 2260/4031* (2013.01); *Y02T 50/671* (2013.01)

(58) Field of Classification Search
CPC ... F01D 15/12; F01D 1/18; F01D 5/02; F01D 5/34; F02C 3/107; F02C 3/06
See application file for complete search history.

(56) References Cited

U.S. PATENT DOCUMENTS

| 5,755,031 A | * | 5/1998 | Baumgarten | ........... B23P 6/005 29/889.1 |
| 6,375,421 B1 | * | 4/2002 | Lammas | ................. F01D 5/005 415/199.5 |

(Continued)

FOREIGN PATENT DOCUMENTS

| EP | 1122443 A2 | 8/2001 |
| WO | 2014055114 A1 | 4/2014 |

OTHER PUBLICATIONS

European Search Report for European Application No. 15171132.2 completed Nov. 9, 2015.

*Primary Examiner* — Steven Sutherland
(74) *Attorney, Agent, or Firm* — Carlson, Gaskey & Olds, P.C.

(57) ABSTRACT

A gas turbine comprises a compressor module, with a lower pressure compressor section including a plurality of stages, with at least one of the plurality of stages being an integrally bladed rotor. A higher pressure compressor section includes a plurality of stages with at least one of the plurality of stages being an integrally bladed rotor. A fan drive turbine shaft drives a fan rotor through a gear reduction. The fan rotor delivers a portion of air into a bypass duct, and a portion of air into the compressor module. A bypass ratio defined by the volume of air delivered into the bypass duct compared to the volume of air delivered into the compressor module is greater than or equal to about 6.0.

5 Claims, 2 Drawing Sheets

(51) Int. Cl.
  *F01D 1/18* (2006.01)
  *F02C 3/06* (2006.01)
  *F01D 5/02* (2006.01)
  *F01D 5/34* (2006.01)
  *F02K 3/06* (2006.01)

(56) References Cited

U.S. PATENT DOCUMENTS

| | | | |
|---|---|---|---|
| 8,437,628 B1 * | 5/2013 | Lin | C21D 9/50 |
| | | | 29/889.7 |
| 8,678,743 B1 | 3/2014 | Sheridan et al. | |
| 2009/0028714 A1 * | 1/2009 | El-Wardany | B23P 15/006 |
| | | | 416/223 R |
| 2009/0320491 A1 | 12/2009 | Copeland | |
| 2011/0064580 A1 * | 3/2011 | Barnes | F01D 5/143 |
| | | | 416/204 A |
| 2012/0102915 A1 * | 5/2012 | Baltas | F02C 3/107 |
| | | | 60/226.3 |
| 2012/0114479 A1 * | 5/2012 | Staubach | F02K 3/06 |
| | | | 415/220 |
| 2012/0171018 A1 | 7/2012 | Hasel et al. | |
| 2012/0308381 A1 | 12/2012 | Suciu et al. | |

* cited by examiner

GEARED TURBOFAN WITH INTEGRALLY BLADED ROTOR

CROSS-REFERENCE TO RELATED APPLICATION

This application claims priority to U.S. Provisional Patent Application No. 62/010,046, filed Jun. 10, 2014.

BACKGROUND OF THE INVENTION

This application relates to a gas turbine engine having a gear driven fan and utilizing integrally bladed rotors in a compressor section.

Gas turbine engines are known and, typically, include a fan delivering air into a bypass duct as propulsion air and further delivering a portion of air into a core engine. The air passing into the core engine moves a compressor section where it is compressed. The compressed air is delivered into a combustor where it is mixed with fuel and ignited. Products of this combustion pass downstream over turbine rotors driving them to rotate. The turbine rotors, in turn, rotate the compressor rotors and the fan rotor.

Historically, in one common type of gas turbine engine, a single turbine rotor drove both a lower pressure compressor and a fan rotor at a common speed. This put limits on the operation of the gas turbine engine as it would be desirable to have the turbine and the lower pressure compressor rotor rotate at a higher speeds, but the fan rotor suggested speed was limited.

Another common type of gas turbine engine utilized a separate fan drive turbine rotor, which directly drove the fan rotor. The same restrictions with regard to the speed of this fan drive turbine existed due to limitations on the speed of the fan rotor.

More recently, it has been proposed to place a gear reduction between a fan drive turbine and the fan.

The compressor rotors typically utilized in gas turbine engines, such as for use on commercial aircraft, have included compressor rotors having hubs that receive removable blades.

It is known to utilize integrally bladed rotors, wherein a hub and a plurality of compressor blades are all formed as one unit. However, such rotors have only been utilized in military applications where performance takes such priority that additional cost is of no concern.

SUMMARY OF THE INVENTION

In a featured embodiment, a gas turbine comprises a compressor module, with a lower pressure compressor section including a plurality of stages, with at least one of the plurality of stages being an integrally bladed rotor. A higher pressure compressor section includes a plurality of stages with at least one of the plurality of stages being an integrally bladed rotor. A fan drive turbine shaft drives a fan rotor through a gear reduction. The fan rotor delivers a portion of air into a bypass duct, and a portion of air into the compressor module. A bypass ratio defined by the volume of air delivered into the bypass duct compared to the volume of air delivered into the compressor module is greater than or equal to about 6.0.

In another embodiment according to the previous embodiment, each of the plurality of stages in the lower pressure compressor section are integrally bladed rotors.

In another embodiment according to any of the previous embodiments, at least one stage in the higher pressure compressor section is provided by a compressor hub having removable blades.

In another embodiment according to any of the previous embodiments, at least one of the compressor stages is downstream of at least one integrally bladed rotor in the higher pressure compressor section.

In another embodiment according to any of the previous embodiments, a final compressor stage in the higher pressure compressor section is the one of the compressor stages with the removable blades.

In another embodiment according to any of the previous embodiments, the higher pressure compressor section has at least six compressor stages.

In another embodiment according to any of the previous embodiments, the bypass ratio is greater than or equal to about 10.0.

In another embodiment according to any of the previous embodiments, the bypass ratio is greater than or equal to about 12.0.

In another embodiment according to any of the previous embodiments, a gear ratio of the gear reduction is greater than or equal to about 2.6.

In another embodiment according to any of the previous embodiments, an overall pressure ratio is defined across the lower pressure compressor section and the higher pressure compressor section, and is greater than or equal to about 35.0 at sea level take-off static 86° F. day conditions.

In another embodiment according to any of the previous embodiments, at least one stage in the higher pressure compressor section is provided by a compressor hub having removable blades.

In another embodiment according to any of the previous embodiments, at least one of the compressor stages is downstream of at least one integrally bladed rotor in the higher pressure compressor section.

In another embodiment according to any of the previous embodiments, a final compressor stage in the higher pressure compressor section is the one of the compressor stages with the removable blades.

In another embodiment according to any of the previous embodiments, the bypass ratio is greater than or equal to about 10.0.

In another embodiment according to any of the previous embodiments, the bypass ratio is greater than or equal to about 12.0.

In another embodiment according to any of the previous embodiments, a gear ratio of the gear reduction is greater than or equal to about 2.6.

In another embodiment according to any of the previous embodiments, an overall pressure ratio is defined across the lower pressure compressor section and the higher pressure compressor section, and is greater than or equal to about 35.0 at sea level take-off static 86° F. day conditions.

In another embodiment according to any of the previous embodiments, the bypass ratio is greater than or equal to about 10.0.

In another embodiment according to any of the previous embodiments, the bypass ratio is greater than or equal to about 12.0.

In another embodiment according to any of the previous embodiments, a common turbine drives the lower pressure compressor section and the fan rotor.

These and other features may be best understood from the following drawings and specification.

DETAILED DESCRIPTION

Figure 1:
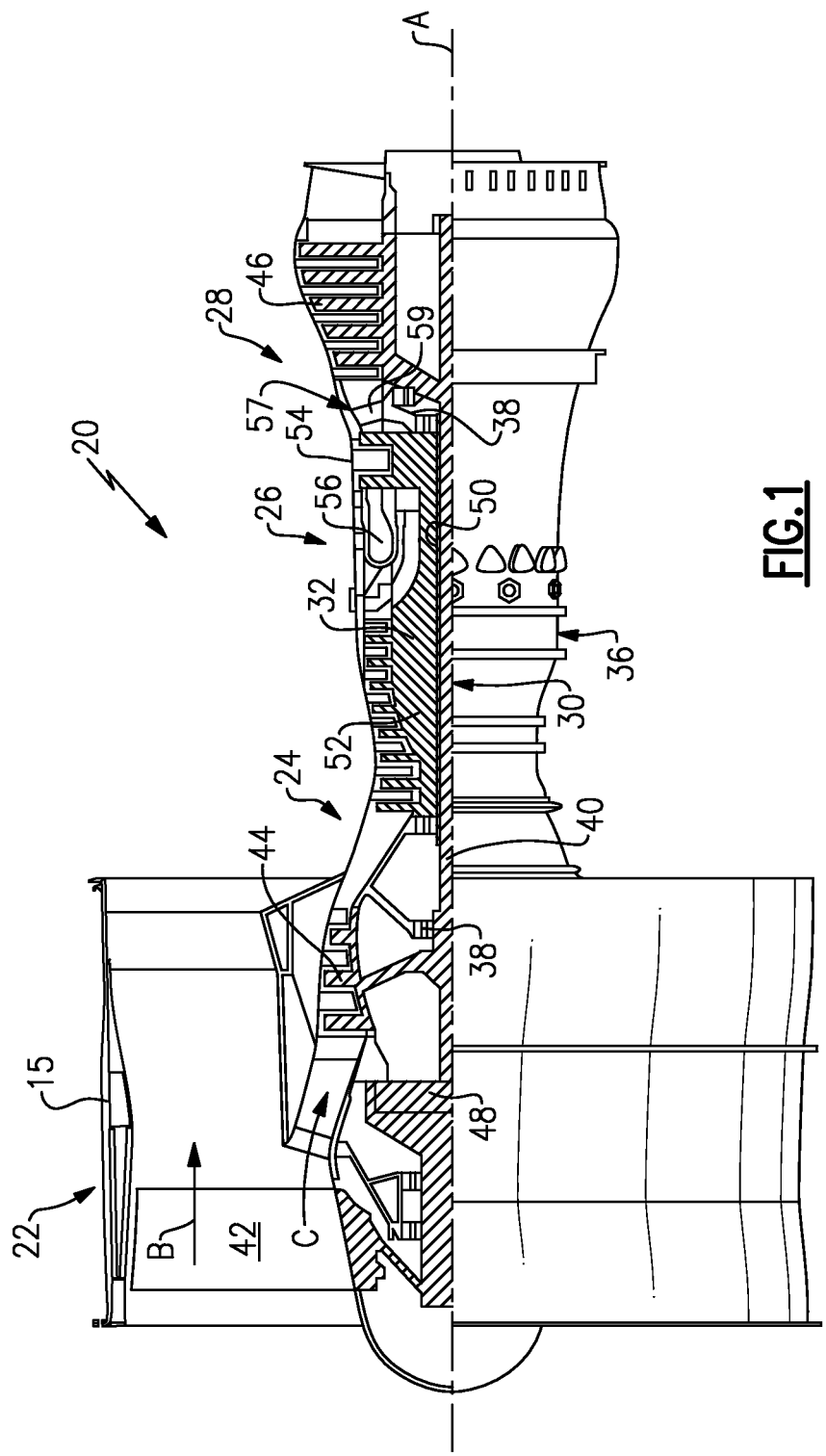
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
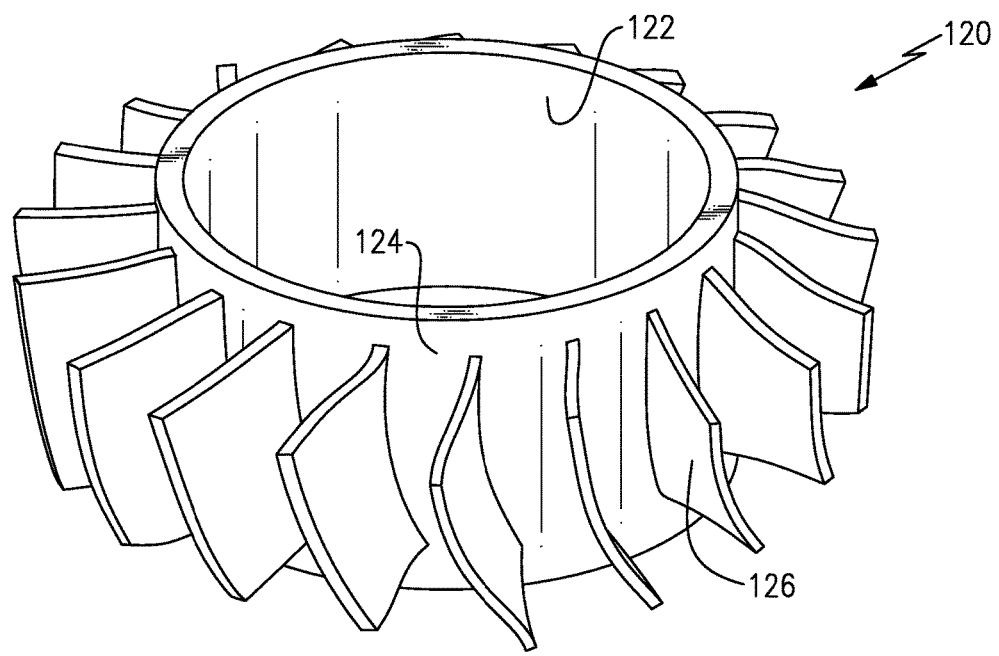
FIG. 2 schematically shows an integrally bladed rotor.

FIG. 2 shows an integrally bladed rotor 120 somewhat schematically. As shown, an inner hub 122 and an outer hub surface 124 are formed as one with a plurality of blades 126.

In commercial gas turbine engines, the use of an integrally bladed rotor has been seen as costly. They are relatively expensive and present maintenance issues. As an example, if a single blade is damaged, the entire rotor stage must be removed which may mean cutting the entire compressor assembly apart if the rotor is a welded together assembly. Thus, their use has been limited to military applications where performance in terms of thrust-to-weight-ratio takes priority over all other issues.

However, with the development of gas turbine engines including a gear reduction to drive the fan, the bypass ratios have increased dramatically. It would be desirable to even further increase bypass ratios. However, to increase bypass ratio, one wants to minimize air flow into the core. For this reason, it becomes important to more efficiently utilize this air.

The use of an integrally bladed rotor eliminates a good deal of leakage paths as compared to a traditional rotor where the blades can be removed from the hub. In addition, the weight is reduced such that weight increases from the gearbox and the larger fan are offset by compressor weight reductions. A large part of the weight reduction stems from the fact that when a compressor rotor has attachment features in the form of slots and blade dovetails, there is a great amount of weight added at a large diameter and with that mass spinning at over 50,000 g's. This requires the entire disk assembly to be increased in weight to make it structurally adequate.

Figure 3:
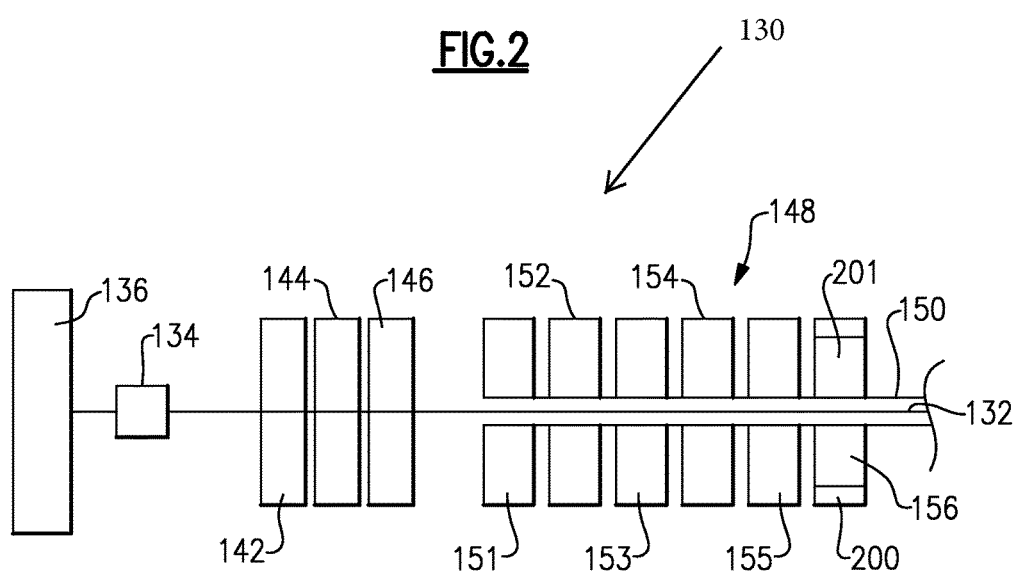
FIG. 3 shows a compressor.

FIG. 3 shows a compressor 130, having two compressor sections 140, 148, as may be used in the FIG. 1 engine. In this embodiment, a shaft 132 is driven by a fan drive turbine to drive a fan rotor 136 through a gear reduction 134. Shaft 132 also rotates a lower pressure compressor section 140. In this embodiment, the compressor section 140 includes three stages 142, 144 and 146. Each are shown as integrally bladed rotor sections.

A higher pressure compressor section 148 is driven by a shaft 150, which is driven by a higher pressure turbine rotor (not shown). As shown, compressor sections 151, 152, 153, 154, and 155 are all disclosed as integrally bladed rotors. However, the last stage 156 is a traditional bladed rotor, wherein a blade 200 may be removed from the hub 201.

As known, the last stage of the compressor is subject to additional challenges compared to more upstream stages. A removable blade 200 and hub 201 may be made of a blade material that is more resistant to creep and less resistant to crack propagation compared to an integrally bladed rotor's disk section where creep and crack propagation are of paramount importance. Further, the use of such a system allows more highly engineered material for the blade 200 than compared to the hub 201 without requiring the entire component to be made of the higher cost, highly engineered material as would be the case if an integrally bladed rotor were used as the final stage.

With the compressor containing both integral and attached blades, a more structurally sound compressor module is achieved as compared with rotors having only integral or attached blades. Higher bypass ratios can be achieved also, as the compressor section will more efficiently use the core airflow. Bypass ratios greater than or equal to about 12.0 can be attained with a gear reduction ratio greater than 2.6. While a single bladed rotor stage 156 is shown downstream of the integrally bladed rotors 151, 152, 153, 154, and 155, more than one bladed rotor stage can be positioned downstream of an integrally bladed rotor.

This system can achieve overall pressure ratios across the two compressor sections 140 and 148 greater than or equal to about 35.0 at sea level take-off, static, 86° F. day conditions. While six stages are shown in the high pressure compressors 148, fewer or more stages could be utilized. The same is true with the lower pressure compressor section 140.

Also, while the lower pressure compressor section 140 is shown rotating with the fan rotor 136, it should be understood that a separate fan drive turbine could drive the fan rotor 136 through a gear reduction.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine comprising:
a compressor module, including:
a lower pressure compressor section including a plurality of stages, with at least one of said plurality of stages being an integrally bladed rotor;
a higher pressure compressor section, including a plurality of stages with at least one of said plurality of stages being an integrally bladed rotor;
a fan drive turbine shaft driving a fan rotor through a gear reduction, said fan rotor delivering a portion of air into a bypass duct, and a portion of air into said compressor module;
wherein at least one stage in said higher pressure compressor section being provided by a compressor hub having removable blades, said compressor hub having slots and said removable blades having dovetails received in said slots; and
at least one stage having removable blades being downstream of said at least one integrally bladed rotor in said higher pressure compressor section.

2. The gas turbine engine as set forth in claim 1, wherein each of said plurality of stages in said lower pressure compressor section are integrally bladed rotors.

3. The gas turbine engine as set forth in claim 1, wherein a final compressor stage in said higher pressure compressor section is said at least one stage with said removable blades.

4. The gas turbine engine as set forth in claim 3, wherein said higher pressure compressor section having at least six compressor stages.

5. The gas turbine engine as set forth in claim 1, wherein a common turbine drives said lower pressure compressor section and said fan rotor.

* * * * *